(12) United States Patent
Itkin et al.

(10) Patent No.: US 10,824,501 B2
(45) Date of Patent: Nov. 3, 2020

(54) COMPUTER CODE INTEGRITY CHECKING

(71) Applicant: Mellanox Technologies, Ltd., Yokneam (IL)

(72) Inventors: Yuval Itkin, Zoran (IL); Ahmad Atamlh, Oxford (GB)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 30 days.

(21) Appl. No.: 16/240,816

(22) Filed: Jan. 7, 2019

(65) Prior Publication Data
US 2020/0218597 A1 Jul. 9, 2020

(51) Int. Cl.
| G06F 11/00 | (2006.01) |
| G06F 11/10 | (2006.01) |
| G06F 12/0895 | (2016.01) |
| G06F 12/10 | (2016.01) |
| G06F 21/57 | (2013.01) |
| G06F 9/455 | (2018.01) |
| H04L 29/06 | (2006.01) |

(52) U.S. Cl.
CPC ...... *G06F 11/1004* (2013.01); *G06F 12/0895* (2013.01); *G06F 12/10* (2013.01); *G06F 21/577* (2013.01); *G06F 9/455* (2013.01); *G06F 2212/1032* (2013.01); *G06F 2212/608* (2013.01); *G06F 2221/034* (2013.01); *H04L 63/0435* (2013.01); *H04L 63/0442* (2013.01)

(58) Field of Classification Search
None
See application file for complete search history.

(56) References Cited

U.S. PATENT DOCUMENTS

| 2004/0042547 A1* | 3/2004 | Coleman | H04N 21/4143 |
| | | | 375/240.01 |
| 2004/0131115 A1* | 7/2004 | Burgess | H04N 7/147 |
| | | | 375/240.01 |

(Continued)

OTHER PUBLICATIONS

R. B. Tremaine, T. B. Smith, M. Wazlowski, D. Har, Kwok-Ken Mak and S. Arramreddy, "Pinnacle: IBM MXT in a memory controller chip," in IEEE Micro, vol. 21, No. 2, pp. 56-68, Mar.-Apr. 2001, doi: 10.1109/40.918003. (Year: 2001).*

(Continued)

*Primary Examiner* — Daniel F. McMahon
(74) *Attorney, Agent, or Firm* — Kligler & Associates Patent Attorneys Ltd

(57) ABSTRACT

Apparatus having a firmware memory storing firmware, a cache memory loading at least part of the firmware for execution by a processor, and a firmware checking engine having a defined syndrome storage location and performing the following iteratively on cache line entries associated with the firmware stored in the cache memory: choose a cache line entry; verify that an address mapped in the cache line entry maps to an address in the firmware memory, and when the cache line entry is locked and the address mapped in the cache line entry maps to an address in the firmware memory, compare a content of the cache line entry to a content of a corresponding address in the firmware stored in the firmware memory, and produce an integrity result indicating whether integrity of the apparatus has been compromised.

23 Claims, 3 Drawing Sheets

(56) References Cited

U.S. PATENT DOCUMENTS

| | | | |
|---|---|---|---|
| 2005/0114894 A1* | 5/2005 | Hoerl | H04N 7/17336 |
| | | | 725/74 |
| 2005/0125519 A1* | 6/2005 | Yang | G06F 3/14 |
| | | | 709/223 |
| 2007/0183493 A1* | 8/2007 | Kimpe | G06F 21/6245 |
| | | | 375/240.1 |
| 2009/0199049 A1 | 8/2009 | Yorimitsu | |
| 2017/0147356 A1 | 5/2017 | Kotary et al. | |
| 2018/0067800 A1 | 3/2018 | Gusev et al. | |
| 2020/0026427 A1* | 1/2020 | Peleg | G06F 3/0619 |

OTHER PUBLICATIONS

European application # 19217639.4 search report dated May 13, 2020.

* cited by examiner

COMPUTER CODE INTEGRITY CHECKING

FIELD OF THE INVENTION

The present invention relates to checking the integrity of computer code in general, and particularly but not exclusively to checking the integrity of computer firmware code.

BACKGROUND OF THE INVENTION

Some systems for checking the integrity of computer code, and in particular systems for checking the integrity of computer system software at the time of system initialization, are known.

SUMMARY OF THE INVENTION

The present invention, in certain embodiments thereof, seeks to provide an improved system and method for checking the integrity of computer code in general, and particularly but not exclusively for checking the integrity of computer firmware code.

There is thus provided in accordance with an exemplary embodiment of the present invention apparatus including a firmware memory configured to store firmware, a cache memory configured to load from the firmware memory at least part of the firmware for execution by a processor, and a firmware checking engine configured to access the cache memory and the firmware memory, the firmware checking engine having a defined syndrome storage location storing a known initial value, the firmware checking engine being further configured to perform the following operations iteratively on a plurality of cache line entries associated with the at least part of the firmware stored in the cache memory: A) choose a cache line entry from the plurality of cache line entries, B) verify that an address mapped in the cache line entry maps to an address in the firmware memory, and producing a firmware mapping result, and C) when the cache line entry is locked and the firmware mapping result indicates that an address mapped in the cache line entry maps to an address in the firmware memory, compare a content of the cache line entry to a content of a corresponding address in the firmware stored in the firmware memory, and produce an integrity result indicating whether integrity of the apparatus has been compromised.

Further in accordance with an exemplary embodiment of the present invention the integrity result indicates that integrity of the apparatus has been compromised when the content of the cache line entry does not match the content of the corresponding address of the firmware stored in the firmware memory.

Still further in accordance with an exemplary embodiment of the present invention the firmware checking engine is further configured to: D) when at least one of the following is true, use the integrity result in computing a syndrome value and store the syndrome value in the defined syndrome storage location in internal storage in the firmware checking engine: the integrity result indicates that the content of the cache line does not match the corresponding address in the firmware stored in the firmware memory, a "dirty" cache indication is set in the cache line entry, and the first result indicates that the firmware address in the cache line entry does not map to an address in the firmware memory.

Additionally in accordance with an exemplary embodiment of the present invention the firmware checking engine is configured to operate during execution of instructions by the processor.

Moreover in accordance with an exemplary embodiment of the present invention the firmware memory includes a runtime-read-only firmware memory.

Further in accordance with an exemplary embodiment of the present invention the defined syndrome storage location includes a secure location whose contents are not modifiable by software running in the processor.

Still further in accordance with an exemplary embodiment of the present invention the operations performed iteratively on a plurality of cache line entries are performed on all cache line entries associated with said at least part of the firmware stored in the cache memory.

Additionally in accordance with an exemplary embodiment of the present invention the operations performed iteratively on a plurality of cache line entries are performed in a random or pseudo-random order.

Moreover in accordance with an exemplary embodiment of the present invention the syndrome value includes a CRC value.

Further in accordance with an exemplary embodiment of the present invention the syndrome value includes a hash value.

Still further in accordance with an exemplary embodiment of the present invention the known initial value is zero.

Additionally in accordance with an exemplary embodiment of the present invention the apparatus also includes a communication interface in operative association with the firmware checking engine, the communication interface being configured to send a message to a destination external to the apparatus, the message indicating whether or not the apparatus is in a compromised state.

Further in accordance with an exemplary embodiment of the present invention the communication interface is configured to send the message to a destination external to the apparatus only upon receiving an indication from the firmware checking engine that the syndrome value differs from the known initial value.

Moreover in accordance with an exemplary embodiment of the present invention the destination external to the apparatus includes a preconfigured destination.

Further in accordance with an exemplary embodiment of the present invention the destination includes one or more of the following: a host computer; a baseboard management controller; and an external Root of Trust.

Still further in accordance with an exemplary embodiment of the present invention the communication interface includes a PCIe interface.

Additionally in accordance with an exemplary embodiment of the present invention the communication interface includes a network communication interface.

Moreover in accordance with an exemplary embodiment of the present invention the message includes an encrypted message.

Further in accordance with an exemplary embodiment of the present invention the encrypted message is encrypted using one of symmetric encryption, and asymmetric encryption.

Still further in accordance with an exemplary embodiment of the present invention the message includes a signed message.

Additionally in accordance with an exemplary embodiment of the present invention the cache memory is external to the apparatus.

Moreover in accordance with an exemplary embodiment of the present invention the apparatus includes the cache memory.

There is also provided in accordance with another exemplary embodiment of the present invention a method including providing a firmware memory configured to store firmware, providing a cache memory configured to load from the firmware memory at least part of the firmware for execution by a processor, and providing a firmware checking engine configured to access the cache memory and the firmware memory, the firmware checking engine having a defined syndrome storage location storing a known initial value, and the firmware checking engine performing the following operations iteratively on a plurality of cache line entries associated with the at least part of the firmware stored in the cache memory: A) choosing a cache line entry from the plurality of cache line entries, B) verifying that an address mapped in the cache line entry maps to an address in the firmware memory, and producing a firmware mapping result, and C) when the cache line entry is locked and the firmware mapping result indicates that an address mapped in the cache line entry maps to an address in the firmware memory, comparing a content of the cache line entry to a content of a corresponding address in the firmware stored in the firmware memory, and producing an integrity result indicating whether integrity of the apparatus has been compromised.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

The following overview provides a general non-limiting introduction to certain exemplary embodiments of the present invention.

The inventors of the present invention believe that known systems for checking the integrity of computer system code are generally used for checking the integrity of computer system code at the time of system startup, and that such systems are not effective in detecting the possibility that computer system code which passed checks of integrity at the time of system startup later became corrupted. Generally speaking, important computer system code which should not be subject to unauthorized change is kept in flash firmware storage memory, and is read into cache memory at the time of system startup (initialization). Methods (details of which are not part of the scope of exemplary embodiments of the present invention) are known to check the integrity of code in the flash firmware storage memory at the time of system startup. For example, the firmware (or a hash thereof) may be signed with an asymmetric cryptographic signing algorithm using a secret key; at the time of system startup, the signature may be checked using a public key to ensure integrity of the firmware.

Corruption of firmware after system startup might take place, by way of non-limiting example, if software running on the computer system succeeds in changing cache contents in an unauthorized manner. In certain exemplary embodiments of the present invention, as described below, systems and methods are provided with the intent of detecting such corruption and frustrating attempts to operate a computer system whose system code has been corrupted.

Figure 1:
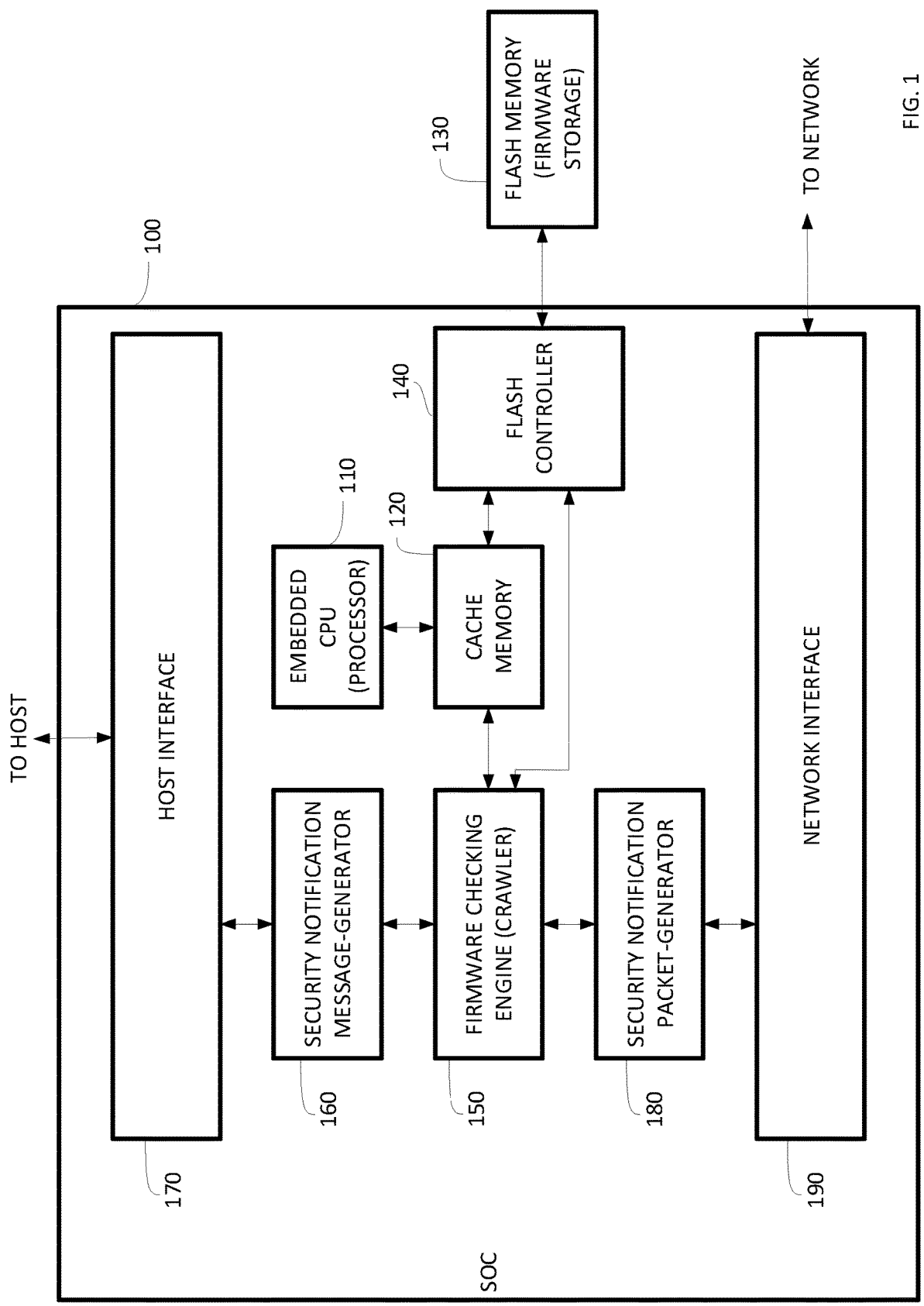
FIG. 1 is a simplified block diagram illustration of a system for checking the integrity of computer code, constructed and operative in accordance with an exemplary embodiment of the present invention.

Reference is now made to FIG. 1, which is a simplified block diagram illustration of a system for checking the integrity of computer code, constructed and operative in accordance with an exemplary embodiment of the present invention.

In certain exemplary embodiments, the system of FIG. 1 comprises a system-on-chip (SOC) 100, which may comprise or be comprised in, for example, a network switch, a networking interface controller (NIC), or another suitable system. A plurality of other components comprised in the system of FIG. 1 are shown as comprised in the SOC 100; alternatively, at least some of those components need not be comprised in the SOC 100. The example of the SOC 100 is a non-limiting example; while in some exemplary embodiments a system-on-chip such as the SOC 100 may be used, it is appreciated that implementing the system of FIG. 1 using an SOC 100 is not required.

The SOC 100 may comprise, by way of particular non-limiting example: an application specific integrated circuit (ASIC); a field programmable gate array (FPGA); or an appropriate plurality of digital and/or analog elements in operative association, the elements comprising, for example, one or more processors, memory, one or more network interface/s, one or more element/s implementing security features, one or more control modules, and so forth.

The SOC 100 of FIG. 1 comprises a processor (also termed herein an "embedded CPU") 110, which is operative to execute instructions (also termed herein "code") stored in a cache memory 120. The processor 110 may also be operative to execute instructions stored in one or more other memories (not shown).

Generally, the cache memory 120 is loaded at a startup time of the SOC 100 from firmware storage (also termed herein "flash memory" or "firmware memory") 130, via a flash controller 140. Generally, the firmware memory is read-only (or at least read-only at runtime, also termed herein "runtime-read-only"). The firmware storage 130 may be external to the SOC 100 as depicted in FIG. 1, or may alternatively be internal to the SOC 100. At startup time, as described above, methods (details of which are not part of the scope of exemplary embodiments of the present invention) may be used to check the integrity of code stored in the firmware storage 130 at the time of system startup. For example, the firmware (or a hash thereof) which is stored in the firmware storage 130 may be signed with an asymmetric cryptographic signing algorithm using a secret key; at the time of system startup, the signature may be checked using a public key to ensure integrity of the firmware.

The SOC 100 of FIG. 1 also comprises a firmware checking engine (also termed herein a "crawler") 150, described in more detail below. The SOC 100 of FIG. 1 may also comprise:

1) A security notification message generator 160, in communication with the firmware checking engine 150 and with a host interface 170 (which may comprise any appropriate host interface such as, by way of non-limiting example, a PCIe interface). The security notification message generator 160 is operative to generate messages and to send the generated messages via the host interface 170 to a host (not shown, external to the system of FIG. 1), as described in more detail below. Similarly, the security notification message generator 160 may be operative to send the generated message via a sideband interface (not shown) to, or also to, an external baseboard management controller (BMC) (not shown) and/or an external Root of Trust (Roots of Trust being well known in the art of hardware security; an external Root of Trust could, for example, take action to indicate that the SOC 100 is compromised); and 2) A security notification packet generator 180, in communication with the firmware checking engine 150 and with a network interface 190 (which may comprise any appropriate network interface such as, by way of non-limiting example, any appropriate Internet network interface). The security notification packet generator 180 is operative to generate one or more packets and to send the generated packet/s via the network interface 190 to a network (not shown, external to the system of FIG. 1) for delivery to a network location, as described in more detail below.

In exemplary embodiments, the security notification message generator 160 and/or the security notification packet generator 180 are one-time configurable following device reset. Once configured by secured-boot code that starts running following a device-level reset, the security notification message generator 160 and/or the security notification packet generator 180 cannot be disabled and cannot be re-configured until the next device-level reset, thus assuring that once a security hazard is identified, the corresponding messages will be generated and that settings cannot be tampered with.

The operation of the apparatus of FIG. 1 is now briefly described. The description of the operation of the apparatus of FIG. 1 is exemplary, and is not meant to be limiting.

As described above, at startup time of the SOC 100, the cache memory 120 is loaded with firmware from the firmware storage 130; at this point the integrity of the loaded firmware is checked using conventional methods as described above.

While the embedded processor 110 operates, the firmware checking engine 150 is operative to examine the cache memory 120 in order to determine whether the integrity of the firmware stored in the cache memory 120 is still intact or whether, conversely, the firmware stored in the cache memory 120 has been tampered with or has otherwise become compromised (has become lacking in integrity). Details of exemplary methods used by the firmware checking engine 150 are described in more detail below.

Generally but not necessarily, the firmware checking engine 150 will check all locations in the cache memory 120 in order to rule out the possibility of even a small change having been made to the firmware stored in the cache memory 120 after the firmware was loaded from the firmware storage 130. Furthermore, it may be desirable for the firmware checking engine 150 to check locations in the cache memory 120 in a random or pseudo-random order, in order to defeat "clever" alterations to the firmware stored in the cache memory 120, the "clever" alterations being designed to frustrate a linear check.

Should the firmware checking engine 150 decide that the firmware stored in the cache memory 120 lacks integrity, the firmware checking engine 150 may instruct one or both of the security notification message generator 160 and the security notification packet generator 180 to generate a message or a packet, respectively, indicating that the SOC 100 cannot be relied upon, due to lack of integrity of the firmware stored in the cache memory 120. The security notification message generator 160 may then send the generated message on via the host interface 170 to a host computer (not shown), which host computer may then take any appropriate action based on the SOC 100 not being able to be relied upon. Similarly, the security notification packet generator 180 may then send the generated packet (or a plurality of generated packets) via the network interface 190 to an appropriate network destination or destinations (not shown), which network destination or destinations may then take any appropriate action based on the SOC 100 not being able to be relied upon.

Non-limiting examples of appropriate actions as referred to immediately above include: the host computer disabling a connection (such as, for example, a PCIe connection) between the SOC 100 and the host computer; the host computer resetting the SOC 100; the host computer powering off the SOC 100; and network destinations noting that the SOC 100 and/or its host computer are no longer to be relied upon and thus that messages coming therefrom are of suspect legitimacy.

It will be appreciated that, in certain exemplary embodiments of the present invention, in addition to sending messages indicating that the firmware is lacking in integrity, the security notification message generator 160 and/or the security notification packet generator 180 may be operative to send other messages to assure that the communication of the security notification message generator 160 and/or the security notification packet generator 180 and their respective destinations are operative and not being tampered with by an attacker. These messages may then be used by the host, by the BMC and/or by the remote network destination to track the functional connection between the SOC 100 and the respective destinations.

Figure 2:
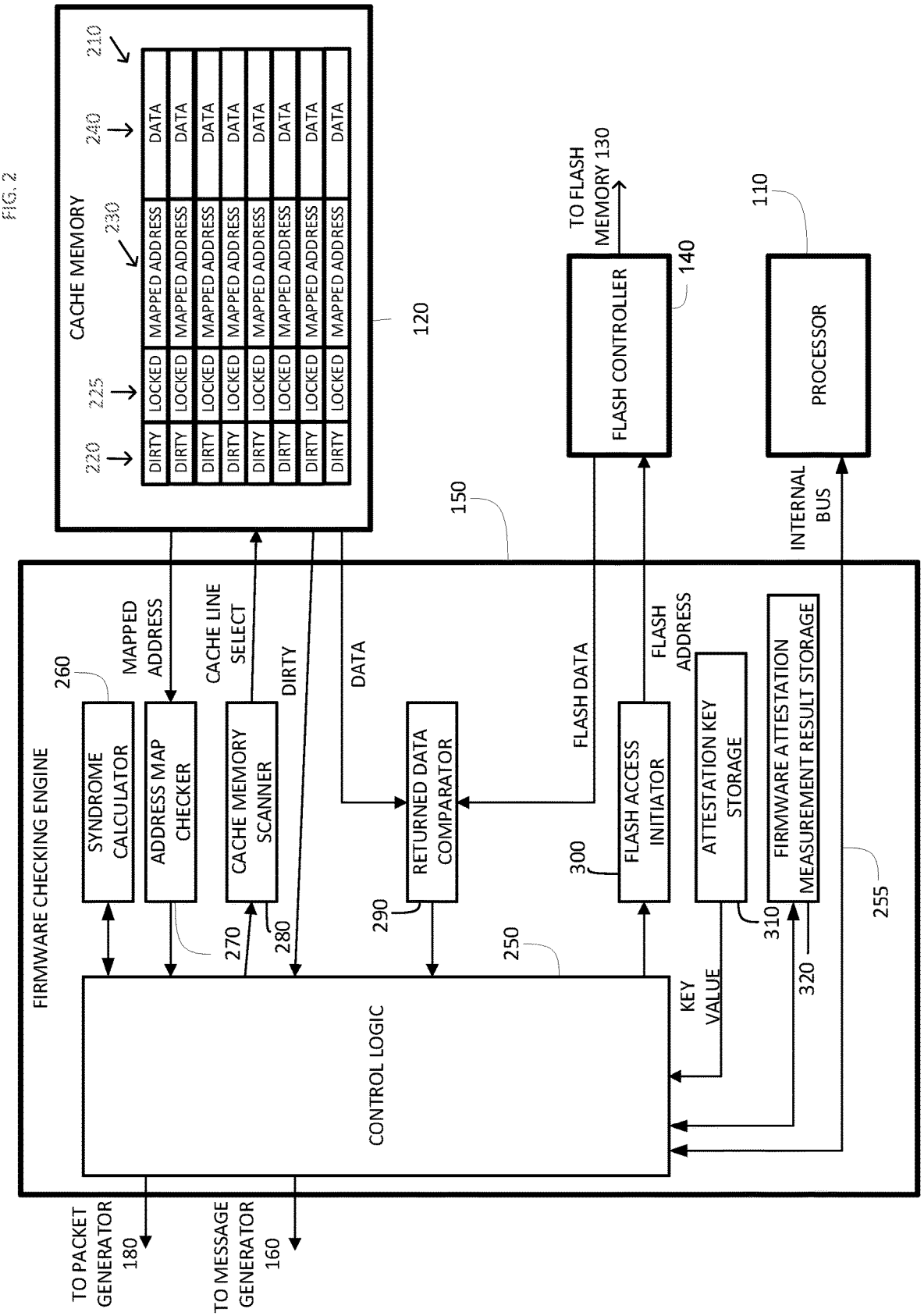
FIG. 2 is a simplified block diagram illustration of an exemplary embodiment of a portion of the system of FIG. 1.

Reference is now additionally made to FIG. 2, which is a simplified block diagram illustration of an exemplary embodiment of a portion of the system of FIG. 1. In particular, FIG. 2 depicts, in an exemplary embodiment and in more detail, the cache memory 120 and the firmware checking engine 150 of FIG. 1, as well as depicting other elements of the system of FIG. 1. Elements of FIG. 1 which are depicted in FIG. 2 are given like reference numbers in FIG. 2.

Except as otherwise described herein, the firmware checking engine 150 and elements thereof may be implemented, in exemplary embodiments, for example, in "hard wired" logic, in one-time programmable logic, in programmable logic with non-volatile storage (not shown) "on-chip" in the SOC 100, in an FPGA, etc.

The cache memory 120 comprises a plurality of cache lines 210, as is known in the art. Each of the plurality of cache lines 210 comprises:

1. A dirty indication 220. The dirty indication 220 indicates whether the particular cache line has been changed, such as by being written to by the CPU 110, since that line was read from its source (in the case of the system of FIGS. 1 and 2, the source is the firmware storage 130).

2. A locked indication 225. The locked indication indicates whether the particular cache line is "locked" and its content cannot be replaced.

3. A mapped address 230, the mapped address indicating an address to which the particular cache line is mapped. In the system of FIGS. 1 and 2, the address is generally (but not necessarily) an address in the firmware storage 130, since the cache 120 is generally intended to store data from addresses in the firmware storage 130, it being appreciated that the cache 120 may also store data from other locations.

4. A data field 240, comprising data corresponding to the mapped address 230. The mapped address 230 may be an address in the flash memory 130. In a general case, the data field 240 could comprise data originating from a write by the CPU 110. In the case of the exemplary embodiment of FIGS. 1 and 2, when the mapped address 230 maps to firmware stored in the flash memory 130, the data field 240 should only comprise content from the firmware storage.

The firmware checking engine 150 of FIG. 2 may include control logic 250. The control logic 250, in exemplary embodiments, comprises programmable logic circuits (although, alternatively, the control logic 250 could comprise "hard wired" logic). The control logic 250 is in operative communication with the CPU 110 via an internal bus 255, and is configured to control the operations of the firmware checking engine 150. In exemplary embodiments of the present invention, the control logic 250 is configured by the processor 110 via the internal bus 255 as part of system startup.

The control logic 250 is in operative communication with the security notification packet generator 180 and the security notification message generator 160 of FIG. 1.

The firmware checking engine 150 may also include:

A syndrome calculator 260, which may be implemented, in exemplary embodiments, for example, in "hard wired" logic, in one-time programmable logic, in programmable logic with non-volatile storage (not shown) "on-chip" in the SOC 100, in an FPGA, etc. For each cache line of the plurality of cache lines 210 which is checked as described below, the syndrome calculator 260 may calculate a syndrome update to the syndrome value; the syndrome is designed so that the syndrome value is zero when no problem is found with any of the plurality of cache lines 210. The syndrome update calculation is described in more detail below. In exemplary embodiments, the syndrome value is stored in a firmware attestation measurement result storage 320, typically comprising a memory, such as a suitable register (described below, and also termed herein a "defined syndrome storage location"). Generally speaking, the attestation measurement result storage 320 cannot be accessed by the software running on the CPU 110 outside the firmware checking engine 150.

An address map checker 270. The address map checker comprises a memory interface, which receives, for a given cache line 210 of the cache 120, the mapped address 230 of said cache line 210 and passes the mapped address 230 on to the control logic 250. If the control logic 250 determines, by inspection of the mapped address 230, that the mapped address 230 maps to a firmware address (also termed herein as "firmware mapping") and the dirty indication 220 of said cache line is not "dirty", then the given cache line 210 "passes the address mapping test"; otherwise, the given cache line 210 "fails the address mapping test", which is an indication of lack of integrity.

In exemplary embodiments, update of the syndrome calculation may, be based (for a given cache line 210) on a comparison (typically taking place in the returned data comparator 290, described below) between data stored in the cache line 210 and corresponding data in a corresponding location in the flash memory 120. If a given cache line 210 does not yield a "firmware mapping" result then the data is not checked and is not included in the update of the syndrome calculation. Any non-zero result of the syndrome update value calculation indicates an integrity problem, and therefore the non-zero result is used to update a syndrome value which is stored, in exemplary embodiments, in a firmware attestation measurement result storage 320 (described below). The actual calculation of syndrome update, for any given cache line 210, may be based on any appropriate hash function or any appropriate CRC function, for example.

A cache memory scanner 280, which chooses lines of the cache lines 210 for checking ("scanning"). The cache lines 210 may be chosen in a random or pseudo-random order, in order to defeat "clever" alterations to the firmware stored in the cache memory 120, the "clever" alterations being designed to frustrate a linear check of the cache lines 210. It is appreciated, however, that alternatively the cache lines 210 may be checked linearly (such as, for example, consecutively in a forward direction; consecutively in a backward direction; etc.); or non-linearly but neither randomly or pseudo-randomly. It is appreciated that, in exemplary embodiments of the present invention, each chosen line of the plurality of cache lines 210 is processed in an atomic operation (in a single clock cycle) such that data stored in the chosen cache line, the mapped address of the chosen cache line, and the dirty indication of the chosen cache line are all sampled at the same time, thus assuring correct interpretation of the cached content in the particular cache line 210; this allows the firmware checking engine 150 to process cache-line content for a chosen cache line at a lower speed after the chosen line is read (sampled).

A returned data comparator 290. For each cache line of the cache lines 210 chosen by the cache memory scanner 280:
the data field of the chosen line 210 is read into the returned data comparator 290; if needed (when the chosen line 210 maps to the firmware storage 130), the data of the corresponding entry in the firmware storage (flash memory) 130 is read via the flash controller 140 into the returned data comparator 290; when data comparison is required, the two data values are compared; and a result of the comparison is sent to the control logic 250. If the two data values are not equal, this is an indication of lack of integrity.

The dirty indication of the chosen cache line 210 is returned to the control logic 250; if the dirty indication indicates that the chosen line 210 is "dirty" when the chosen line 210 yields a "firmware mapping" result, this is an indication of lack of integrity, which is so noted and dealt with in the control logic 250.

A flash access initiator 300, which is operative to access flash memory 130. The flash access initiator 300 is controlled by the control logic 250. When a content in the firmware storage (flash memory) 130 is to be compared with the cache-line data 240, the flash access initiator 300 initiates a read request to the flash controller 140, to read the corresponding firmware data, corresponding to the mapped address 230 in cache line 210.

Attestation key storage 310. The attestation key storage stores a key, which may be a private key for any appropriate asymmetric encryption or signing algorithm (as are known in the art) or may be a key for any appropriate symmetric encryption or attestation algorithms (as are known in the art). A result of the process of checking the firmware, which is stored in a firmware attestation measurement result storage 320, may be encrypted and/or signed before being sent as part of a message via the message generator 160 or as part of a packet via the packet generator 180 or supplied to the CPU 110 via the internal bus 255, to assure a receiver of the message/packet that the contents of the message/packet are genuine.

Figure 3:
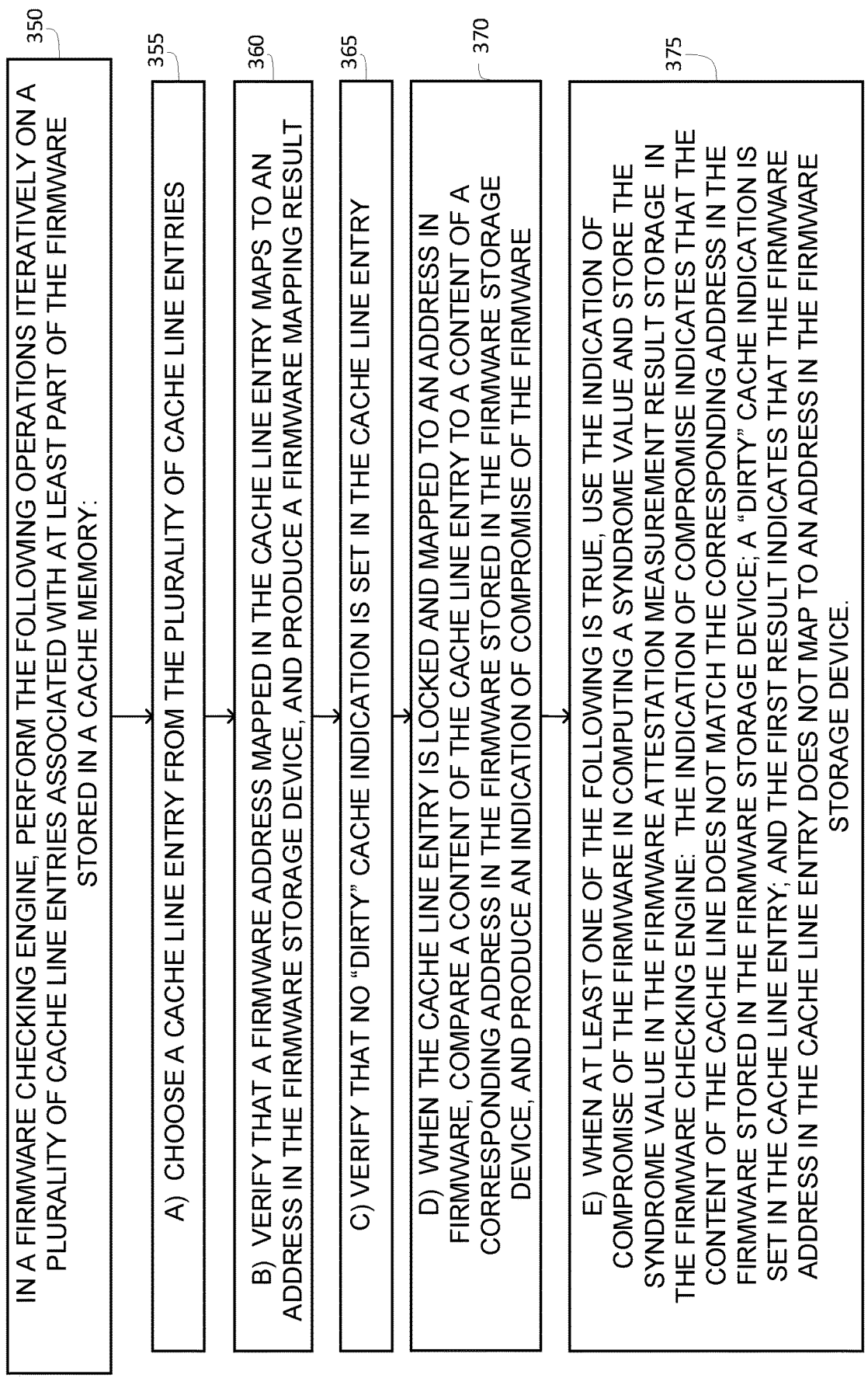
FIG. 3 is a simplified flowchart illustration of an exemplary method of operation of a portion of the system of FIG. 1.

Reference is now made to FIG. 3, which is a simplified flowchart illustration of an exemplary method of operation of a portion of the system of FIG. 1. The method of FIG. 3, which is largely self-explanatory in light of the above description, is, in exemplary embodiments, carried out by the firmware checking engine 150. The method of FIG. 3 includes the following steps:

In the firmware checking engine, the operations indicated in the following steps are performed iteratively on a plurality of cache line entries associated with at least part of the firmware stored in the cache memory (step 350). As described above, typically, but not necessarily, the steps are performed on all of the cache line entries.

A) A cache line entry is chosen from the plurality of cache line entries (step 355, performed in exemplary embodiments by the cache memory scanner 280). As described above, the choice may be made in a random or pseudo-random order; may be made linearly; or may be made non-linearly, but in neither a random nor a pseudo-random order.

B) A check is made (in exemplary embodiments, by the address map checker 270 inspecting the address in the cache line entry) as to whether the address mapped in the cache line entry points to a firmware address; a result (also termed herein a "firmware mapping result") is produced. If the first result indicates that the address mapped in the cache line entry does not point to a firmware address, the particular cache line entry is not of interest.

C) A check is made (in exemplary embodiments, by the control logic 250) as to whether a "dirty" cache indication is set in the cache line entry.

D) If the cache line entry yields a "firmware mapping" result and is locked, the contents of the cache line entry is compared to the contents of a corresponding address in the firmware stored in the firmware memory, and a result (also termed herein a "second result") is produced. It is appreciated that, a given cache line entry that maps to firmware memory will typically be locked when it reflects contents from the firmware, which should remain in the cache memory. If the cache line entry is not locked, the particular cache line entry is not of interest for this step.

E) If at least one of the following is true, a syndrome value is computed, as described above, and is stored in a defined location such as, for example, in internal storage of the firmware checking engine (such as, in a particular example, in the firmware attestation measurement result storage 320 as described above):

the content of the cache line does not match the content of the corresponding address in the firmware stored in the firmware memory; thus, the indication of compromise is an indication that integrity of the firmware and hence of the SOC is compromised;

a "dirty" indication is set in the cache line entry that yields a "firmware mapping"; and the first result indicates that the firmware address in the cache line entry does not map to a firmware address in the firmware memory.

Steps C and E may be optional.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. Apparatus comprising:
a firmware memory configured to store firmware;
a cache memory configured to load from the firmware memory and to store into the cache memory at least part of the firmware for execution by a processor; and
a firmware checking engine configured to access the cache memory and the firmware memory, the firmware checking engine having a defined syndrome storage location storing a known initial value, the firmware checking engine being further configured to perform the following operations iteratively on a plurality of cache line entries associated with said at least part of the firmware stored in the cache memory:
A) choose a cache line entry from said plurality of cache line entries;
B) verify that an address mapped in the cache line entry maps to an address in the firmware memory, and producing a firmware mapping result; and
C) when said cache line entry is locked and said firmware mapping result indicates that an address mapped in the cache line entry maps to an address in the firmware memory, compare a content of said cache line entry to a content of a corresponding address in the firmware stored in the firmware memory, and produce an integrity result indicating whether integrity of the apparatus has been compromised.

2. Apparatus according to claim 1 and wherein said integrity result indicates that integrity of the apparatus has been compromised when the content of said cache line entry does not match the content of the corresponding address of the firmware stored in the firmware memory.

3. Apparatus according to claim 1 and wherein the firmware checking engine is further configured to:
D) when at least one of the following is true, use the integrity result in computing a syndrome value and store the syndrome value in the defined syndrome storage location in internal storage in the firmware checking engine:
the integrity result indicates that the content of the cache line does not match the corresponding address in the firmware stored in the firmware memory; a "dirty" cache indication is set in said cache line entry; and the first result indicates that the firmware address in the cache line entry does not map to an address in the firmware memory.

4. Apparatus according to claim 1 and wherein the firmware checking engine is configured to operate during execution of instructions by the processor.

5. Apparatus according to claim 1 and wherein the firmware memory comprises a runtime-read-only firmware memory.

6. Apparatus according to claim 1 and wherein the defined syndrome storage location comprises a secure location whose contents are not modifiable by software running in the processor.

7. Apparatus according to claim 1 and wherein the operations performed iteratively on said plurality of cache line entries are performed on all cache line entries associated with said at least part of the firmware stored in the cache memory.

8. Apparatus according to claim 1 and wherein the operations performed iteratively on said plurality of cache line entries are performed in a random or pseudo-random order.

9. Apparatus according to claim 1 and wherein the known initial value stored in the defined syndrome storage location comprises a CRC value.

10. Apparatus according to claim 1 and wherein the known initial value stored in the defined syndrome storage location comprises a hash value.

11. Apparatus according to claim 1 and wherein the known initial value is zero.

12. Apparatus according to claim 1 and also comprising a communication interface receiving the integrity result from the firmware checking engine, the communication interface being configured to send a message to a destination external to the apparatus, the message indicating whether or not the apparatus is in a compromised state.

13. Apparatus according to claim 12 and wherein the communication interface is configured to send said message to said destination external to the apparatus only upon receiving an indication from the firmware checking engine that a value stored in the defined syndrome storage location differs from the known initial value.

14. Apparatus according to claim 13 and wherein the destination external to the apparatus comprises a preconfigured destination.

15. Apparatus according to claim 13 and wherein the destination external to the apparatus comprises one or more of the following: a host computer; a baseboard management controller; and an external Root of Trust.

16. Apparatus according to claim 15 and wherein the communication interface comprises a PCIe interface.

17. Apparatus according to claim 15 and wherein the communication interface comprises a network communication interface.

18. Apparatus according to claim 12 and wherein the message comprises an encrypted message.

19. Apparatus according to claim 18 and wherein the encrypted message is encrypted using one of: symmetric encryption; and asymmetric encryption.

20. Apparatus according to claim 13 and wherein the message comprises a signed message.

21. Apparatus according to claim 1 and comprising a system-on-chip (SOC),
wherein the SOC comprises the cache memory and the firmware checking engine, and
the firmware memory is external to the SOC.

22. Apparatus according to claim 1 and comprising a system-on-chip (SOC),
wherein the SOC comprises the cache memory, the firmware checking engine, and the firmware memory.

23. A method comprising:
providing a firmware memory configured to store firmware;
providing a cache memory configured to load from the firmware memory at least part of the firmware for execution by a processor; and
providing a firmware checking engine configured to access the cache memory and the firmware memory, the firmware checking engine having a defined syndrome storage location storing a known initial value; and
the firmware checking engine performing the following operations iteratively on a plurality of cache line entries associated with said at least part of the firmware stored in the cache memory:
A) choosing a cache line entry from said plurality of cache line entries;
B) verifying that an address mapped in the cache line entry maps to an address in the firmware memory, and producing a firmware mapping result; and
C) when said cache line entry is locked and said firmware mapping result indicates that an address mapped in the cache line entry maps to an address in the firmware memory, comparing a content of said cache line entry to a content of a corresponding address in the firmware stored in the firmware memory, and producing an integrity result indicating whether integrity of the apparatus has been compromised.

\* \* \* \* \*